(12) United States Patent
Hampel et al.

(10) Patent No.: US 9,887,044 B2
(45) Date of Patent: Feb. 6, 2018

(54) TEXTURED CURRENT COLLECTOR FOIL

(71) Applicants: Ulrich Hampel, Grevenbroich (DE); Kathrin Eckhard, Bonn (DE); Simon Jupp, Bonn (DE); Andreas Siemen, Jüchen (DE)

(72) Inventors: Ulrich Hampel, Grevenbroich (DE); Kathrin Eckhard, Bonn (DE); Simon Jupp, Bonn (DE); Andreas Siemen, Jüchen (DE)

(73) Assignee: Hydro Aluminium Rolled Products GmbH, Grevenbroich (DE)

(*) Notice: Subject to any disclaimer, the term of this patent is extended or adjusted under 35 U.S.C. 154(b) by 301 days.

(21) Appl. No.: 14/526,779

(22) Filed: Oct. 29, 2014

(65) Prior Publication Data

US 2015/0050558 A1    Feb. 19, 2015

Related U.S. Application Data

(63) Continuation of application No. PCT/EP2013/059003, filed on Apr. 30, 2013.

(30) Foreign Application Priority Data

May 2, 2012 (DE) .................. 10 2012 103 834

(51) Int. Cl.
*H01M 4/70* (2006.01)
*H01G 11/04* (2013.01)
(Continued)

(52) U.S. Cl.
CPC .............. *H01G 11/04* (2013.01); *C25D 5/16* (2013.01); *C25D 7/0692* (2013.01); *H01G 11/68* (2013.01);
(Continued)

(58) Field of Classification Search
CPC ........ H01G 11/68; H01G 11/70; H01G 11/04; H01M 4/661; H01M 4/667; H01M 4/70;
(Continued)

(56) References Cited

U.S. PATENT DOCUMENTS

2007/0166613 A1    7/2007    Kogetsu et al.
2009/0269609 A1    10/2009    Hirayama
(Continued)

FOREIGN PATENT DOCUMENTS

CN    102376959 A    3/2012
DE    101 08 893 A1    10/2002
(Continued)

OTHER PUBLICATIONS

E. Perre et al., Direct electrodeposition of aluminium nano-rods, Electrochemistry Communications, Journal, 4 pages, 2008, Elsevier B.V., Europe.
(Continued)

*Primary Examiner* — Gary Harris
(74) *Attorney, Agent, or Firm* — Reinhart Boerner Van Deuren P.C.

(57) ABSTRACT

The invention relates to a current collector foil for batteries, accumulators or capacitors, comprising a carrier material and at least one electrically conductive layer made from a metal. Moreover, the invention relates to a method for producing a corresponding current collector foil as well as to the advantageous use thereof. The object of providing a current collector foil for batteries, accumulators or capacitors, which is optimized in relation to the contact surface and the adhesive properties and which results in an improved service life, is achieved as a result of the fact that the at least one electrically conductive layer is produced at least partially by electrodepositing a metal and has a texture.

11 Claims, 1 Drawing Sheet

(51) Int. Cl.
    H01G 11/68    (2013.01)
    H01G 11/70    (2013.01)
    H01M 4/66     (2006.01)
    C25D 5/16     (2006.01)
    C25D 7/06     (2006.01)
(52) U.S. Cl.
    CPC ............ H01G 11/70 (2013.01); H01M 4/661 (2013.01); H01M 4/667 (2013.01); H01M 4/70 (2013.01); *Y02E 60/13* (2013.01); *Y02T 10/7022* (2013.01)
(58) Field of Classification Search
    CPC ......... C25D 5/16; C25D 7/0692; Y02E 60/13; Y02T 10/7022
    USPC ........................................................ 429/239
    See application file for complete search history.

(56) References Cited

U.S. PATENT DOCUMENTS

| 2013/0108922 A1 | 5/2013 | Shinozaki et al. | |
| 2014/0342236 A1* | 11/2014 | Goyal | B82Y 10/00 |
| | | | 429/245 |

FOREIGN PATENT DOCUMENTS

| EP | 0 397 523 A2 | 11/1990 |
| JP | 02-312160 A | 12/1990 |
| JP | 2010-123494 A | 6/2010 |
| KR | 10-2006-0061282 A | 6/2006 |
| KR | 10-2006-0062005 A | 6/2006 |
| KR | 10-2010-0127983 A | 12/2010 |
| WO | WO 2011/108464 A1 | 9/2011 |
| WO | WO 2012/002380 A1 | 1/2012 |

OTHER PUBLICATIONS

Cyrille Lecoeur et al., Al Current Collectors for Li-Ion Batteries Made via a Template-Free Electrodeposition Process in Ionic Liquids, Apr. 19, 2010, 6 pages, vol. 157 (6), Journal of the Electrochemical Society, Amiens Cedex, France.

* cited by examiner

TEXTURED CURRENT COLLECTOR FOIL

CROSS-REFERENCE TO RELATED PATENT APPLICATIONS

This patent application is a continuation of PCT/EP2013/059003, filed on Apr. 30, 2013, which claims priority to German Application No. 10 2012 103 834.1, filed on May 2, 2012, the entire teachings and disclosure of which are incorporated herein by reference thereto.

FIELD OF THE INVENTION

The invention relates to a current collector foil for batteries, accumulators or capacitors, comprising a carrier material and at least one electrically conductive layer made from a metal. Moreover, the invention relates to a method for producing a corresponding current collector foil as well as to the advantageous use thereof.

BACKGROUND OF THE INVENTION

The provision of efficient, cost-effective and durable means for storing electrical energy is one of the key technologies that are of importance for the change-over of motor vehicles to electric drives as well as for the development of regenerative sources of energy. Nowadays, batteries, accumulators or capacitors are used as a means for storing electrical energy. Especially accumulators, preferably lithium ion accumulators, have high energy densities and therefore allow an efficient storage of electrical energy. The current collector foils of the cathode of a lithium ion accumulator may be made from an aluminium foil, which provides very good electrical conductivity at low material costs. The current collector foil of the cathode is here additionally coated with a metal oxide, for example with a lithium cobalt oxide, lithium manganese oxide, lithium iron phosphate or with other active electrode materials. The metal oxide forms the active electrode material that can receive lithium ions during the discharge process and can, during the charging process, release these again to an anode, the active electrode material of which is graphite, for example. It has been found that the size of the contact surface and the adhesion between the active electrode material and the current collector foil are factors that have an effect on the service life of the lithium ion accumulator as well as on the capacity retention thereof. The adhesion between the current collector foil and the active electrode material as well as the contact surface of the current collector foil with the active electrode material are critical factors for achieving constant charging and discharging properties of the lithium ion accumulator. If the active electrode material becomes partially separated, the capacity will decrease down to a complete failure of the accumulator. Moreover, in order to produce maximum capacity it is desirable to maximise the contact surface between the current collector foil and the active electrode material. The same principally also applies to other types of accumulators, batteries and capacitors that have current collector foils and are of a similar design.

Furthermore, a method for electrochemically depositing metals, in particular aluminium, from ionic liquids is known from published German document DE 101 08 893 A1.

SUMMARY OF THE INVENTION

Proceeding from this, the present invention is based on the object of providing a current collector foil for batteries, accumulators or capacitors, which is optimised in relation to the contact surface and the adhesion properties and results in an approved service life.

According to a first teaching of the present invention, the above-indicated object for a current collector foil is achieved as a result of the fact that the at least one electrically conductive layer is produced at least partially by way of electrodepositing aluminium and has a texture.

Electrodeposition is a deposition method which allows the deposition of high-purity metals onto a surface and provides at the same time texturing of the surface of the deposited metal. This texturing of the surface leads to a significant increase of the contact surface and moreover to enhanced adhesion properties for example of the active electrode material of a lithium ion accumulator, but also of the electrolyte of a capacitor. Due to the high-purity deposition of metals, electrodeposition allows at the same time the electric resistances to be reduced during the electrodeposition of aluminium.

Preferably, according to a first embodiment of the current collector foil according to the invention, the order of magnitude of the texture is adapted to the particle size of the active electrode material. According to the invention, this adaptation is understood to mean that the texture has properties, i. e. surface roughness, surface waviness or surface structure, which are of the same order of magnitude as the particle size of the active electrode material. If, for example, the active electrode material has a particle size of 0.1 µm, then a same order of magnitude is understood to refer to structures having a size of more than 0.01 µm and less than 1 µm. As a result, the active electrode material can adhere particularly well to the current collector foil.

According to a further embodiment, the current collector foil is intended for the cathode and the electrically conductive layer is produced at least partially by way of electrodepositing aluminium. Aluminium can be deposited onto a carrier material in sufficient amounts, so that an electrically conductive layer with a texture is obtained. The created texture leads for example to a significant increase of the contact surface with the active electrode material of an accumulator. The deposited aluminium includes for example a structure in the nanometer, submicrometer or micrometer range, which determines the texture of the current collector surface. In cases where, due to the potential ratios, aluminium is also suitable as an anode, such as for example in the case of active anode materials like lithium titanium oxide for accumulators having high power and at the same time low energy, the textured foil can of course also be used as an anode current collector.

According to a further embodiment of the present current collector foil, the carrier material is an aluminium foil that consists of aluminium or an aluminium alloy. The transition resistances between the active electrode paste and the current collector foil can be substantially reduced by the deposited aluminium. Moreover, the aluminium foil that forms the carrier material is also ideally suited for the electrodeposition of aluminium. In addition, due to its low electric resistance it can also improve current discharge. Moreover, an aluminium foil can be produced at low costs and in the necessary widths and thicknesses of 5 µm to 50 µm, preferably 10 µm to 25 µm, and can subsequently be cladded by way of electrodeposition.

Preferably, the crystallite size of the deposited aluminium is 1 nm to 5000 nm, preferably 25 nm to 500 nm. The crystallite size and the amount of deposited crystallites determine the roughness of the deposited electrically conductive layer. By adapting the roughness of the surface to the respective particle structure of the active electrode paste to be applied, a particularly good adhesion between the current collector foil and the active electrode material is achieved. Additionally, the contact surface between the active electrode material and the current collector foil is increased as a result of the deposited aluminium crystallites.

In a further embodiment, the aluminium foil is as-rolled in order to facilitate the processing of the current collector foil into a capacitor, a battery or an accumulator. As-rolled means that the aluminium foil has not been subjected to a final annealing or thermal degreasing process after the cold rolling operation. Therefore, the as-rolled aluminium foil has maximum values in respect of mechanical tensile strength and is in this respect more suitable for being processed.

Typically, the current collector foil is made from an aluminium alloy of the type ENAW 1050, ENAW 1200 or ENAW 1058. The aluminium alloys mentioned are all low alloys and therefore have a very good electrical conductivity. Moreover, all three aluminium alloys can be easily cold-rolled into aluminium foils having thicknesses of 5 µm to 50 µm or 15 to 25 µm.

Preferably, an aluminium foil with an alkali- or acid-pickled surface may also be used for electrodeposition. These aluminium foils do not need to be annealed for degreasing and therefore have maximum achievable mechanical tensile strengths. These are for example above 135 MPa.

According to a second teaching of the present invention, the above-mentioned object is achieved in respect of a method for producing a current collector foil by producing the electrically conductive layer at least partially by way of electrodepositing aluminium onto the carrier material.

Generally, a metal foil may be used as the carrier material. The electrodeposition of aluminium results in the production of structured textures on the carrier material, which are optimised so as to obtain a contact surface that is as large as possible and has an adhesion strength that is as great as possible and, due to the high purity of the deposited metal, which are also optimised in respect of the electric resistance. In this respect, the electrically conductive layer may have optimal properties for example in conjunction with the active electrode material of a lithium ion accumulator.

If the carrier material is made from an aluminium foil of aluminium or an aluminium alloy, which is textured by means of an aluminium electrodeposition process, a current collector foil that enhances the service life of a battery or an accumulator may be provided.

According to a further embodiment, the order of magnitude of the texture of the aluminium deposited onto the carrier material corresponds to the particle size of the active electrode material, so that the adhesion and the contact surface between the active electrode material and the current collector foil may be optimised.

Preferably, the electrodeposition is carried out from an ionic liquid, so that also common metals such as for example aluminium may be deposited. Ionic liquids, low-melting salts or salt mixtures for example consisting of fluorophosphates or sulfonates of imidazolium salts, with the addition of metal halides, are used as an electrolyte.

In order to control and to regulate the texture to be adjusted, the electrodeposition may be carried out in a potentiostatic or a galvanostatic manner. During potentiostatic deposition, the electrode potential is kept constant during the electrodeposition process. On the other hand, during galvanostatic electrodeposition it is the amperage that is kept constant.

According to a further embodiment of the method according to the invention, the electrodeposition is carried out by way of galvanostatic or potentiostatic monopolar or bipolar pulsed deposition, where the metal deposition is controlled at least in terms of the pulse height, the pulse width, the pause length or the frequency or a combination of the variables mentioned. Due to the number of parameters mentioned, the method can be adjusted such that an optimal texture is achieved on the carrier material. Thus, the texture generated by electrodeposition may be optimised in respect of the active electrode material used.

As a result of the deposition, the surface of the current collector foil is increased, which results in a larger contact surface on the active electrode material. Preferably, the deposition parameters such as pulse height, pulse width, pause length or frequency, in conjunction with the electrolyte materials used, are used to adjust the crystallite size of the deposited aluminium to 1 nm to 5000 nm, preferably to 25 nm to 500 nm. The crystallite sizes and the texture resulting therefrom may be adapted to the particle sizes of the active electrode mass, which is desirable in relation to the adhesion properties between the active electrode material and the current collector foil.

A particularly economical method for providing a current collector foil according to the invention may be achieved by implementing, in a further embodiment, the electrodeposition using a coil-to-coil method. Corresponding coil-to-coil methods are particularly efficient because the electrodeposition process is carried out in strip-wise manner and the coil thus produced can be transferred to further strip-wise processing steps, for example to a metal oxide coating process, in a simple manner. In this way, large quantities of current collector foil may be produced within a short period of time.

Finally, the above-mentioned object may be achieved by using a current collector foil according to the invention for batteries, accumulators, lithium ion accumulators or capacitors. If the current collector foil according to the invention is used for the above-mentioned means for storing electrical energy, it is expected that due to the submicrometer texture of the current collector foil according to the invention, this has a significantly positive effect on the service life of batteries, accumulators, lithium ion accumulators or capacitors. Moreover, the electrodeposition allows the contact surface between the current collector foil and the active electrode material or the electrolyte to be increased, as a result of which the capacity of the battery, the accumulator or the capacitor is increased.

BRIEF DESCRIPTION OF THE DRAWINGS

The invention will be explained in more detail below by means exemplary embodiments in conjunction with the drawing.

DETAILED DESCRIPTION OF THE INVENTION

Figure 1:
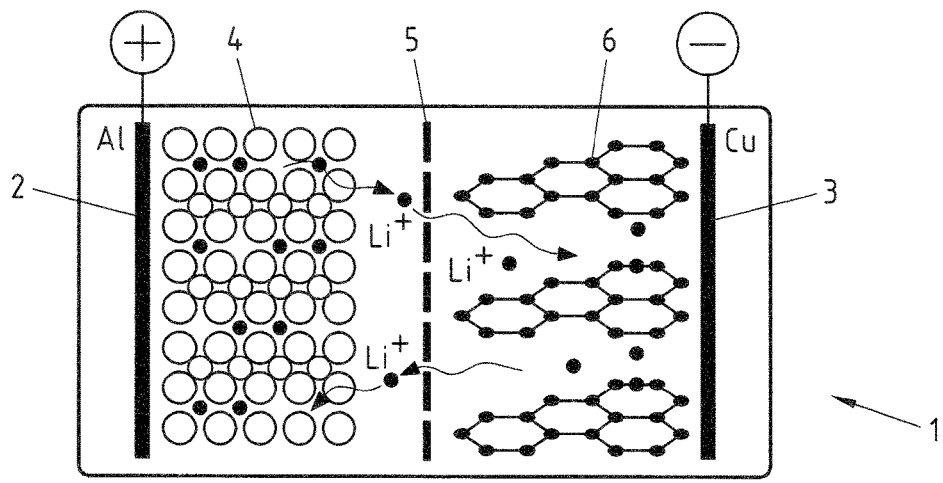
FIG. 1 shows a schematic illustration of a lithium ion accumulator.

FIG. 1 shows the typical design of a lithium ion accumulator 1, which includes a current collector foil 2 on the cathode and a current collector foil 3 on the anode. The cathodic current collector foil 2 is additionally coated with a metal oxide, for example with a lithium cobalt oxide 4. A separator 5, which is merely permeable to lithium ions $Li^+$, separates the metal oxide coating of the cathode from the active electrode material of the anode, which is formed for example by graphite 6. The anode 3 is provided for example by a current collector foil made from copper. The available surface, on which charge can be stored, is an important criterion for the capacity of a lithium ion accumulator, but also for a capacitor and/or a corresponding battery. The current collector foils of the anode and the cathode, as shown in FIG. 1, can therefore include an electrically conductive layer, which is produced at least partially by way of electrodepositing a metal and has a texture. The texture produced by electrodepositing aluminium onto the current collector foil results in an increase of the surface of the current collector foil and therefore of the contact surface between the active electrode material 4, 6 and the associated current collector foils 2, 3. It has been shown that the adhesion properties of the active electrode material 4, 6 may also be enhanced as a result of the texture of the current collector foils 2, 3. Due to the manufacturing process by electrodeposition, the texture of the current collector foils 2, 3 has dimensions for example in the micrometer or in the submicrometer range.

In respect of its order of magnitude, the structure of the deposited aluminium layer is preferably adapted to the particle size of the metal oxide, in order to ensure a particularly good adhesion of the metal oxide. In this case, the size for example of the surface waviness, roughness or structure is in the order of magnitude, i. e. the difference amounts to no more than a factor of 10, of the particle size of the metal oxide.

Figure 2:
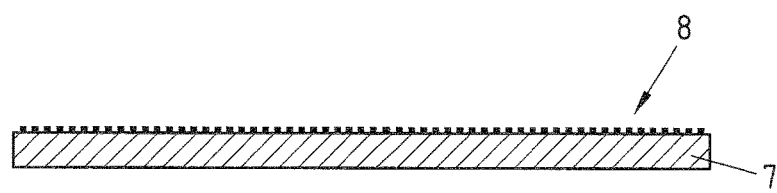
FIG. 2 shows a first exemplary embodiment of the current collector foil according to the invention in a schematic illustration.

FIG. 2 shows a schematic sectional view of an exemplary embodiment of a current collector foil according to the invention, which consists of a carrier material 7 and an electrically conductive layer 8 provided on the carrier material. Preferably, the carrier material consists of an aluminium foil, for example an as-rolled aluminium foil made from an aluminium alloy of the type ENAW 1085. Corresponding aluminium alloy foils may be provided in a thickness of preferably 5 to 50 µm, in particular 10 to 25 µm in an as-rolled state, so that these have a relatively high tensile strength. As a result, the processing of the aluminium foils into the current collector foil is facilitated. The current collector foil shown in FIG. 2 also has an electrically conductive layer 8 applied by way of electrodeposition, which has a texture in the submicrometer range. The aluminium layer applied during electrodeposition has a crystallite size of 1 nm to 5000 nm, preferably of 25 to 500 nm, as a function of the parameters used during electrodeposition. The crystallite size has an effect on the texture created and the adaptation of the surface texture to the particle size of the active electrode material is presently regarded as more favourable for the service life of a lithium ion accumulator.

In principle it is also conceivable to produce the carrier layer from a material that is different from the one used for the electrically conductive layer applied by electrodeposition. Preferably, however, an identical material system is chosen, i. e. for example an aluminium alloy in the case of an aluminium deposition, in order to prevent corrosion problems.

Figure 3:
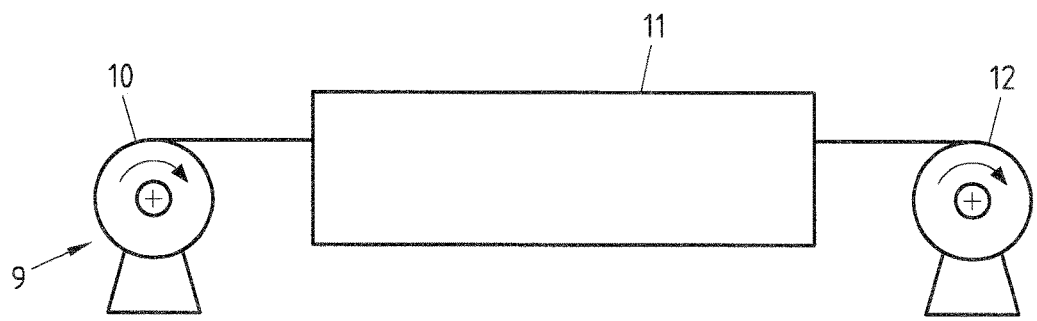
FIG. 3 shows a schematic illustration of a device for carrying out a coil-to-coil method for producing a current collector foil.

FIG. 3 shows, in a very schematic view, a device for producing a current collector foil using a coil-to-coil method. Initially, FIG. 3 shows a decoiler 9, on which a coil 10, which consists for example of an aluminium foil made from an aluminium alloy of the type ENAW 1085, is disposed. The foil is unwound and is fed to a device for carrying out electrodeposition 11. In the device 11, the carrier material, in the present case the aluminium foil, is coated with aluminium by way of potentiostatic or galvanostatic electrodeposition from an ionic liquid. What can be used as an ionic liquid is for example 1-ethyl-3-methyl-1H-imidazolium chloride (EMIC) mixed with non-aqueous aluminium chloride. By applying a voltage across the aluminium film acting as the cathode and a counter-electrode, for example from glassy carbon, the aluminium foil can be coated with aluminium from the ionic liquid. Subsequently, the coated aluminium foil is wound back up onto a coil using a recoiler 12.

The current collector foil according to the invention allows a considerable increase of the service life and the capacity retention of accumulators, batteries and capacitors. At the same time, a carrier material may be coated over a large area by way of electrodeposition, so that the current collector foil can also be produced in an economical manner.

The invention claimed is:

1. Current collector foil coated with active electrode material for batteries or accumulators, comprising a carrier material and at least one electrically conductive layer made from a metal, wherein the at least one electrically conductive layer is produced at least partially by electrodeposition of aluminium and has a texture, wherein the current collector foil is intended for the cathode of a battery or an accumulator, the carrier material is an aluminium foil made from aluminium or an aluminium alloy, the order of magnitude of the texture is adapted to the particle size of the active electrode material in such a way, that the texture has a surface structure, surface waviness or surface roughness, which is of the same order of magnitude as the particle size of the active electrode material, the crystallite size of the deposited aluminium amounts to 1 nm to 500 nm.

2. Current collector foil according to claim 1, wherein the current collector foil is an as-rolled aluminium foil.

3. Current collector foil according to claim 1, wherein the current collector foil is made from an aluminium alloy of the type EN AW 1050, EN AW 1200 or EN AW 1085.

4. Method for producing a current collector foil for the cathode of a battery or accumulator according to claim 1, which is made from a carrier material and at least one electrically conductive material made from a metal, wherein the electrically conductive layer is produced at least partially by way of electrodepositing aluminium onto the carrier material and is coated with active electrode material, wherein the carrier material is made from an aluminium foil consisting of aluminium or an aluminium alloy, which is textured by way of electrodepositing aluminium, the order of magnitude of the texture of the aluminium deposited onto the carrier material corresponds to the particle size of the active electrode material, such that the texture has a surface structure, surface waviness or surface roughness, which is of the same order of magnitude as the particle size of the active electrode material and the crystallite size of the deposited aluminium is adjusted to be 1 to 500 nm.

5. Method according to claim 4, wherein the electrodeposition is carried out from an ionic liquid.

6. Method according to claim 4, wherein the electrodeposition is carried out in a potentiostatic or a galvanostatic manner.

7. Method according to claim 4, wherein the electrodeposition is carried out by way of a monopolar or bipolar pulsed deposition, wherein the deposition is controlled at least by the pulse height, the pulse width, the pause length or the frequency or a combination thereof.

8. Method according to claim 4, wherein the crystallite size of the deposited aluminium is adjusted to 25 to 500 nm.

9. Method according to claim 4, wherein the electrodeposition is carried out using a coil-to-coil method.

10. Apparatus comprising a current collector foil according to claim 1, wherein said current collector foil forms a portion of one of a battery, accumulator, lithium ion accumulator and capacitor.

11. Current collector foil according to claim 1, wherein a crystallite size of the deposited aluminium amounts to 25 nm to 500 nm.

* * * * *